United States Patent
Feinberg

(10) Patent No.: US 6,569,947 B1
(45) Date of Patent: May 27, 2003

(54) IONOMER/HIGH DENSITY POLYETHYLENE BLENDS WITH IMPROVED IMPACT

(75) Inventor: Stewart Carl Feinberg, Exton, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/056,654

(22) Filed: Jan. 25, 2002

(51) Int. Cl.$^7$ .................. C08L 33/02; C08L 77/06
(52) U.S. Cl. .............. 525/195; 525/201; 525/221; 525/72; 525/78; 525/360; 525/361
(58) Field of Search .................. 525/195, 201, 525/221, 72, 78, 360, 361

(56) References Cited

U.S. PATENT DOCUMENTS

| | | |
|---|---|---|
| 3,264,272 A | 8/1966 | Rees |
| 3,520,861 A | 7/1970 | Thomson et al. |
| 4,026,967 A | 5/1977 | Flexman, Jr. et al. |
| 4,248,990 A | 2/1981 | Pieski et al. |
| 4,252,924 A | 2/1981 | Chatterjee |
| 4,351,931 A | 9/1982 | Armitage |
| 4,387,188 A | 6/1983 | Statz |
| 4,992,486 A | 2/1991 | Feinberg |
| 5,089,332 A | 2/1992 | Feinberg |
| 5,091,478 A | 2/1992 | Saltman |
| 5,118,746 A | 6/1992 | Feinberg |
| 5,160,788 A | 11/1992 | Feinberg |
| 5,643,999 A | 7/1997 | Lee et al. |
| 5,721,314 A | 2/1998 | Hausmann |
| 5,859,137 A * | 1/1999 | Chou ............... 525/178 |
| 5,866,658 A | 2/1999 | Talkowski |
| 6,207,761 B1 | 3/2001 | Smith et al. |

* cited by examiner

*Primary Examiner*—James J. Seidleck
*Assistant Examiner*—Olga Asinovsky

(57) ABSTRACT

A maleic anhydride modified ethylene polymer/ionomer/high density polyethylene blend having improved impact resistance (e.g., increased low temperature Izod impact) can be achieved by the addition of a maleic anhydride grafted high ethylene derived polymer (e.g., MAN-g-HDPE, MAN-g-VLDPE, MAN-g-EPR, MAN-g-EPDM, and the like) to ionomer and high density polyethylene during blending. The blends exhibiting improved impact resistance characteristics according to the instant invention are particularly useful in the manufacture of automotive parts, panels and the like having a "class A" surface.

10 Claims, No Drawings

IONOMER/HIGH DENSITY POLYETHYLENE BLENDS WITH IMPROVED IMPACT

BACKGROUND OF THE INVENTION

1. Field of the Invention

The present invention relates to a maleic anhydride modified ethylene polymer/ionomer/high density polyethylene blend having improved impact resistance. More specifically but not by way of limitation, the present invention relates to the incorporation of a maleic anhydride modified ethylene polymer (e.g., maleic anhydride grafted high density polyethylene, MAN-g-HDPE; maleic anhydride grafted very low density polyethylene, MAN-g-VLDPE; maleic anhydride grafted ethylene propylene rubber, MAN-g-EPR; or maleic anhydride grafted ethylene propylene diene monomer rubber, MAN-g-EPDM), into an ionomer/high density polyethylene blend in order to improve low temperature Izod impact.

2. Description of the Related Art

It is generally known in the art to employ a thermoplastic alloy based on a blend of ionomer and high density polyethylene or polyamide for injection molding exterior automotive molded-in-color fascia, bumper covers, side moldings and other decorative trim. These types of polymer blends are disclosed, for example, in U.S. Pat. Nos. 4,387,188 and 5,866,658, respectively. Each involve a copolymer of an α-olefin, typically ethylene, copolymerized with an α, β-ethenically unsaturated carboxylic acid, typically acrylic acid, methacrylic acid or mixtures thereof, wherein the acid copolymer has preferably from 5 to 80 percent of the acid groups neutralized with metal ions such as zinc, sodium or the like. Such ionomers are commercially available under the tradename Surlyn® from E. I. du Pont de Nemours and Company. In the '188 patent, the partially neutralized acid copolymer is blended with a linear polymer of α-olefins and glass fiber to produce a molding resin. In the '658 patent, the highly neutralized acid copolymer is blended with one or more polyamides which constitute a continuous or co-continuous phase of the resulting blend. One difficulty with such blends is the achieving and sustaining of low temperature impact resistance, particularly in the absence of reinforcing fiber.

BRIEF SUMMARY OF THE INVENTION

In view of the above-mentioned problem, it has now been discovered that the addition or incorporation of maleic anhydride modified ethylene derived polymer (e.g., a maleic anhydride grafted high density polyethylene, MAN-g-HDPE; maleic anhydride grafted very low density polyethylene, MAN-g-VLDPE; maleic anhydride grafted ethylene propylene rubber, MAN-g-EPR; or maleic anhydride grafted ethylene propylene diene monomer rubber, MAN-g-EPDM) into an ionomer/high density polyethylene blend improves low temperature Izod impact. More specifically, the low temperature Izod impact for non-fiber reinforced blends of ionomer/HDPE is essentially doubled by the addition of MAN-g-HDPE.

Thus the present invention provides a maleic anhydride modified ethylene polymer/ionomer/high density polyethylene blend having improved impact resistance comprising for every one hundred parts by weight of ionomer/high density polyethylene blend from one to twenty parts by weight ethylene polymer modified with from 0.2 to 5.0 weight percent maleic anhydride. Preferably the ethylene polymer modified with maleic anhydride is selected from the group consisting of a maleic anhydride grafted high density polyethylene (MAN-g-HDPE), a maleic anhydride grafted very low density polyethylene (MAN-g-VLDPE), a maleic anhydride grafted ethylene propylene rubber (MAN-g-EPR), a maleic anhydride grafted ethylene propylene diene monomer rubber (MAN-g-EPDM), and mixtures thereof.

The present invention further provides a method of improving impact resistance of an ionomer/high density polyethylene blend to comprising the steps of:
(i) adding for every one hundred parts by weight cumulative of ionomer and high density polyethylene from one to twenty parts by weight maleic anhydride modified ethylene polymer; and
(ii) mixing the maleic anhydride modified ethylene polymer, ionomer and high density polyethylene at elevated temperature and high shear rate.

Most preferably the polyethylene modified with maleic anhydride is a maleic anhydride grafted high density polyethylene (MAN-g-HDPE).

DETAILED DESCRIPTION OF THE INVENTION

The present invention involves the addition of maleic anhydride modified ethylene polymer to an ionomer/high density polyethylene blend in order to sustain or improve impact resistance of the resulting blend. For purposes of describing this invention the term "copolymer", unless otherwise specified, refers to a polymer derived from the polymerization of two or more different monomers that are alternative reactants during the polymerization. As such, the term copolymer is intended to include both "terpolymer" as well as polymers produced from more than three comonomers yet also includes "bipolymer". The term "blend" is intended to refer to a combination, admixture and/or plurality of polymers with or without additives that collectively function or result in a thermoplastic matrix or polymer alloy, albeit, micro-analysis may reveal dispersed, continuous, and/or discontinuous phases. Also, the phrase "consisting of" means that the recited components are essential, while smaller amounts of other components may be present to the extent that they do not detract from the operability of the present invention. In contrast, the term "comprising" is intended to acknowledge that significant amount of other components may be present provide that some of the benefit and/or advantages of the instant invention are still being realized (e.g., improved or sustained impact characteristics, and the like).

The ionomer/high density polyethylene blends useful according to the instant invention broadly includes any such thermoplastic alloy based on combining or mixing a neutralized or partially neutralized ethylene/α,β-unsaturated carboxylic acid copolymer (referred to herein as acid copolymer) with a thermoplastic linear polyethylene. Such blends may and frequently are reinforced with various fibers. These types of polymer blends with reinforcing fibers are disclosed, for example, in U.S. Pat. No. 4,387,188, incorporated herein by reference. As taught in this reference, the acid copolymer content of the blend was typically from 38 to 90 weight percent of the blend; however, it is now contemplated that 20 to 80 weight percent acid copolymer is a more preferred range. Such acid copolymers from which the ionomer is derived are further described in U. S. Pat. Nos. 3,520,861; 4,026,967; 4,252,924; and 4,248,990, incorporated herein by reference. The neutralized and partially neutralized ionic copolymers (ionomers) are described in U.S. Pat. No. 3,264,272, also incorporated herein by reference.

The high density polyethylene of the ionomer/HDPE blend according to the present invention can be any such thermoplastic linear polyolefin as generally known in the art. The density of the polyethylene will range from about 0.91 to 0.97, preferably 0.935 to about 0.970, and most preferably 0.95 to about 0.97. The HDPE will typically be characterized by a melt index generally within the broad range of 0.1 to 100, but preferably is from about 0.3 to about 10, most preferably from about 2 to about 6 for injection molded grade and less than 2 for film and blow molding grades. As such, the HDPE will be a relatively high molecular weight polymer of predominantly ethylene; with or without small amounts of other copolymerized α-olefins resulting in a linearity typically characterized by about eight or less branch points per thousand carbon atoms as generally known in the art. The HDPE content of the blend is typically from 20 to 80 weight percent of the blend, preferably from 50 to 75 percent and most preferably from 60 to 70 weight percent.

The maleic anhydride modified ethylene polymer impact additive will preferably have from 0.2 to 5.0 weight percent maleic anhydride comonomer or an equivalent acid content incorporated into the ethylene polymer. For purposes of the present invention, it is contemplated that other unsaturated dicarboxylic acid such as fumaric, itaconic and mesaconic acids having structures closely related to and potentially precursors to a similar anhydride after the grafting reaction should be considered equivalent to the MAN in the MAN-modified additive. The actual grafting reaction for incorporating the maleic anhydride onto the ethylene polymer can be performed essentially by any of the methods generally known in the art. The impact modified blends of the present invention may have up to about 20 weight percent of a maleic anhydride (MAN) modified ethylene polymer incorporated into the ionomer/high density polyethylene blend as an impact resistant additive. However it should be appreciated for purposes of this invention that the benefits of the instant invention may be partially realized at maleic anhydride modified polymer-loading levels greater than twenty weight percent and in such cases should be considered an equivalent for purposes of this invention.

For purposes of this invention, the ethylene polymer which is to be modified by the reaction with maleic anhydride or equivalent dicarboxylic acid can generally be any thermoplastic or elastomeric polymer composition derived from polymerizing predominantly ethylene monomer. As such, this includes essentially any polyethylene polymer or polyethylene copolymer as generally known in the art. Preferably, the ethylene polymer includes high density polyethylenes (HDPE), very low density polyethylenes (VLDPE), ethylene propylene rubber (EPR) including ethylene propylene diene rubber (EPDM) and the like. As shown in the attached examples the low temperature Izod impact is significantly influenced by the addition of about 10 weight percent maleic anhydride modified HDPE.

In practice, the impact modified blends of the present invention will advantageously contain minor amounts, typically up to a few percent, of other additives such as pigments, coloring agents, carbon black, ultraviolet light stabilizers, antioxidants, processing aids, fiber glass, mineral fillers, anti-slip agents, plasticizers, nucleating agents, and the like. Various such additives and their respective use are well known in the art and commercially used in connection with ionomer/HDPE blend applications. Typical preferred combinations are specifically illustrated in the examples.

The preparation of the blends according to the instant invention can be performed using standard mixing practices, as generally known in the art. Preferably a commercial mixer such as a Banbury or commercial thermoplastic extruder, in particular a twin-screw extruder, or the like is used to achieve complete admixing of the components and to give a homogenous dispersion of the components. Alternatively the final dispersion can be achieved in the final injection molding or extrusion of the article of manufacture starting from separate components, intermediates, component precursors, or some combination of the same. The blending can also be performed in stages depending on the choice and availability of starting components. As such, a commercially available ionomer/HDPE blend can be directly co-extruded with the maleic anhydride modified ethylene polymer impact additive. Alternatively the ionomer, HDPE and the maleic anhydride modified ethylene polymer can be simultaneously co-extruded to achieve the desired blend. It is further contemplated that the degree of neutralization of the ionomer can be intentionally elevated during the blending step by addition of metal hydroxide, metal oxide or the like. It is further contemplated that HDPE and the maleic anhydride modified ethylene polymer along with an unsaturated carboxylic acid (E/AA or E/MAA) copolymer precursor of the ionomer can be employed with a neutralizing metal component in the co-extrusion process, thus making the ionomer in situ during the blending.

The following examples are presented to more fully demonstrate and further illustrate various aspects and features of the present invention. As such, the showings are intended to further illustrate the differences and advantages of the present invention but are not meant to be unduly limiting. In presenting the following examples all blends, unless otherwise specified, were extrusion compounded on a ZSK-30 co-rotating twin screw extruder using typically the following temperature profile:

Feed: Cold
Zone 1: 150° C.
Zone 2: 225° C.
Zone 3: 225° C.
Zone 4: 225° C.
Die (Single strand, ¼ inch diameter): 230° C.
Screw Speed: 200 rpm
Output Rate: 15 to 20 lb/hr
Melt Temperature: typically 245 to 260° C.

Test bars (5 inch by ½ inch by ⅛ inch), plaques (3 inch by 5 inch by ⅛ inch), and disks (3 inch by ⅛ inch) for physical testing were molded using a single screw injection molding machine using typically the following temperature profile and conditions:

Rear: 220° C.
Center: 225° C.
Front: 230° C.
Nozzle: 230° C.
Mold: 25° C.
Ram Speed: Fast
Screw Speed: 60 rpm
Injection Time: 35 seconds
Hold Time: 25 seconds
Back Pressure: 50 psig Various test conditions for determining physical properties were employed. Melt Index (MI) was determined according to ASTM D1238, condition E, at a temperature of 190° C. and load of 2,160 grams. Tensile properties were determined according to ASTM D1708 using (1½ inch by ⅝ inch by ⅛ inch bars die-cut from plaques (3 inch by 5 inch by ⅛ inch). The measurements were made on an Instron operated at a crosshead speed of 2 inch/minute. Flexural modulus was measured on (5 inch by ½ inch by ⅛ inch) test bars using a 2 inch span, according to ASTM D790. Notched Izod impact was determined according to ASTM D256 using (2½ inch by ½ inch by ⅛ inch) bars having a 0.1 inch notch machined into the side of the bar. The bars were derived from a single 5 inch by ½ inch by ⅛ inch molded bar that is then cut into two halves (i.e., one near the gate end and the other is the far end). Determination of the Dynatup instrumented impact according to ASTM D3763 was performed in the vertical mode on 3 inch by ⅛ inch disks at Tup Size of ½ inch and drop speed of 5 mph (i.e., 10 inch drop in height with 98.2 lb load).

The raw starting materials, their characterization and respect commercial source are summarized as follows:

Alathon® 7030—HDPE, MI=2.8 (Spec Range=2.4–3.2) (Lyondell Petrochemical Co.).

Chimassorb® 944 FD—Hindered amine light stabilizer (Ciba-Geigy Corp.).

Flexomer DFDB9042—Ethylene/butene VLDPE, ~15% butene, density ~0.900, MI=5 (Union Carbide Corp.)

Flexomer DFDU1085—Ethylene/butene VLDPE, >15% butene, density=0.884–0.900, MI=3–4 (Union Carbide Corp.)

Fusabond® E MB-100D—MAN-modified Sclair 2907 HDPE; ~1% MAN, MI=2 (Modified Polymers, DuPont of Canada).

Fusabond® N MN-493D—MAN modified Engage 8180 VLDPE, ~0.5% MAN, MI=1.3

Fusabond® N MF-520D; MAN modified Nordel® IP3745P, MAN-g-Ethylene/propylene/hexadiene terpolymer (DuPont). ~0.5% MAN, MI=1.3

Irganox® 1010=Tetrakis(methylene(3,5-di-tert-butyl-4-hydroxycinnamate) (Ciba-Geigy Corp.).

Irganox® B215=1:2/Irganox® 1010/Irgafos 168 blend. Irgafos 168=Tris(2,4-di-tert-butylphenyl)phosphate (Ciba-Geigy Corp.).

Nordel® 2722=Narrow Molecular weight distribution elastomer, 72/21/7: Ethylene/propylene/hexadiene terpolymer (DuPont).

Surlyn® 9520—90/10:E/MAA copolymer, 68–71% neutralized with zinc, base resin MI=33; ionomer MI=1.1.

Tinuvin® 770 DF=UV stabilizer (Ciba-Geigy Corp.).

EXAMPLE 1

A series of seven different blends of high density polyethylene and ionomer were prepared and tested as generally described above. Six of the runs involved a maleic anhydride (MAN) modified high density polyethylene (Sclair 2907 HDPE) commercially available from DuPont of Canada under the tradename Fusabond® E MB-100D (MAN-g-HDPE; ~1% MAN, MI=2). Details of the compositions and resulting data are presented in the TABLE 1. As shown in this table, the addition of Fusabond® E MB-100D, a maleic anhydride modified polyethylene, more than doubled low temperature notched Izod impact without reducing flexural modulus.

TABLE 1

| Run | 1 | 2 | 3 | 4 | 5 | 6 | 7 |
|---|---|---|---|---|---|---|---|
| ALATHON ® 7030 | 60.05% | 50.05% | 47.55% | 47.55% | 47.55% | 45.05% | 45.05% |
| SURLYN ® 9520 | 36.30% | 36.30% | 33.80% | 33.80% | 33.80% | 31.80% | 31.80% |
| IRGANOX ® 1010 | 0.15% | 0.15% | 0.15% | 0.15% | 0.15% | 0.15% | 0.15% |
| NORDEL ® 2722 | — | — | 5.0% | — | — | — | — |
| Flexomer DFDB9042 | — | — | — | 5.0% | — | 10.0% | — |
| Flexomer DFDU1085 | — | — | — | — | 5.0% | — | 10.0% |
| ZnO (CS8749-5) | 3.50% | 3.50% | 3.50% | 3.50% | 3.50% | 3.50% | 3.50% |
| Fusabond ® EMB-100D | — | 10.0% | 10.0% | 10.0% | 10.0% | 10.0% | 10.0% |
| Flex Modulus (psi) | 115,300 | 119,300 | 106,400 | 105,600 | 106,500 | 101,600 | 102,100 |
| Tensile @ Yield (psi) | 3,250 | 3,270 | 3,030 | 3,110 | 3,120 | 2,930 | 3,030 |
| Elong. @ Yield (%) | 12% | 12% | 13% | 12% | 12% | 13% | 12% |
| Max. Tensile (psi) | 3,250 | 3,700 | 3,400 | 3,410 | 3,610 | 3,150 | 3,250 |
| Elong. @ Max. Tensile (%) | 12% | 350% | 360% | 380% | 370% | 370% | 390% |
| Tensile @ Bk (psi) | 3,200 | 3,700 | 3,390 | 3,410 | 3,590 | 3,140 | 3,430 |
| Elong. @ Bk (%) | 200% | 360% | 360% | 380% | 370% | 380% | 400% |
| Notched Izod Impact @ −30° C. | | | | | | | |
| Gate End | 9.51 | 20.2 | 21.7 | 20.3 | 21.5 | 18.2 | 21.4 |
| Far End | 10.11 | 21.4 | 27.4 | 26.6 | 22.6 | 22.1 | 22.3 |
| Dynatup Instrumented Impact @ −30° C. | | | | | | | |
| Impact Energy (ft-lbs) | | 80.9 | 81.7 | 81.4 | 80.7 | 80.8 | 80.7 |
| Total Energy (ft-lbs) | | 27.0 | 24.9 | 27.9 | 26.2 | 26.7 | 28.6 |
| Melt Tension (cN) | 13.6 | 14.1 | 12.3 | 9.0 | 9.4 | 9.8 | 10.7 |

EXAMPLE 2

In a manner analogous to Example 1, a series of seven additional blends of high density polyethylene and ionomer were prepared and tested. Run 1 was essentially a repeat of Run 2 of Example 1 using 10 weight percent maleic anhydride modified high density polyethylene (Fusabond® EMB-100D; MAN-g-HDPE, ~1% MAN, MI=2) as the impact additive. The other six runs involved the use of a maleic anhydride modified very low density polyethylene (Fusabond® N MN-493D; MAN-g-VLDPE, ~0.5% MAN, MI=1.3) and a maleic anhydride modified ethylene propylene hexadiene terpolymer (Fusabond® N MF-520D; MAN-g-EPDM, ~0.65% MAN, MI=0.6). Details of the compositions and resulting data are presented in the TABLE 2. As shown in this table, the addition of a maleic anhydride modified VLDPE and EPDM show impact improvement relative to the control (Run 1 of Example 1) but not as dramatic as the improvement associated with the MAN-g-HDPE additive.

TABLE 2

| Run | 1 | 2 | 3 | 4 | 5 | 6 | 7 |
|---|---|---|---|---|---|---|---|
| ALATHON ® 7030 | 50.05% | 52.90% | 52.90% | 50.05% | 50.05% | 50.14% | 50.05% |
| SURLYN ® 9520 | 36.30% | 38.45% | 38.45% | 36.30% | 36.30% | 36.21% | 36.30% |
| IRGANOX ® 1010 | 0.15% | 0.15% | 0.15% | 0.15% | 0.15% | 0.15% | 0.15% |
| ZnO (CS8749-5) | 3.50% | 3.50% | 3.50% | 3.50% | 3.50% | 3.50% | 3.50% |
| FUSABOND E MB-100D | 10.00% | 5.00% | — | 10.00% | 10.00% | — | — |
| FUSABOND N MN-493D | — | — | 5.00% | — | — | 10.00% | — |
| FUSABOND N MF-520D | — | — | — | — | — | — | 10.00% |
| TENSILE PROPERTIES @ Room Temp. | | | | | | | |
| Tensile @ Yield (psi) | 3,390 | 3,030 | 2,740 | 3,050 | 3,270 | 2,410 | 2,660 |
| Elong. @ Yield (%) | 12% | 12% | 14% | 12% | 11% | 15% | 15% |
| Max. Tensile (psi) | 3,730 | 3,710 | 3,450 | 3,780 | 3,880 | 3,420 | 3,430 |
| Elong. @ Max. Tensile (%) | 360% | 330% | 290% | 360% | 350% | 300% | 300% |
| Tensile @ Brk (psi) | 3,730 | 3,710 | 3,450 | 3,780 | 3,790 | 3,410 | 3,430 |
| Elong. @ Brk (%) | 370% | 330% | 290% | 370% | 350% | 297% | 300% |
| FLEX MODULUS (psi) | 115,300 | 106,600 | 83,700 | 107,900 | 114,300 | 70,600 | 78,800 |
| NOTCHED IZOD IMPACT @ −30° C. | | | | | | | |
| Gate End | 26.3 | 18.0 | 16.6 | 18.5 | 18.46 | 16.6 | 16.37 |
| Far End | 20.6 | 23.6 | 22.7 | 23.8 | 23.65 | 20.0 | 19.75 |
| DYNATUP INSTRUMENTED IMPACT @ −30° C. | | | | | | | |
| Impact Energy (ft-lbs) | 81.0 | 77.3 | 77.2 | 77.1 | 78.5 | 77.6 | 78.4 |
| Total Energy (ft-lbs) | 27.2 | 25.3 | 25.5 | 26.7 | 27.4 | 26.6 | 26.8 |

Having thus described and exemplified the invention with a certain degree of particularity, it should be appreciated that the following claims are not to be so limited but are to be afforded a scope commensurate with the wording of each element of the claim and equivalents thereof.

I claim:

1. A maleic anhydride modified ethylene polymer/ionomer/high density polyethylene blend having improved impact resistance comprising for every one hundred parts by weight of ionomer/high density polyethylene blend from one to twenty parts by weight ethylene polymer modified with from 0.2 to 5.0 weight percent maleic anhydride.

2. A maleic anhydride modified ethylene polymer/ionomer/high density polyethylene blend of claim 1 wherein said ethylene polymer modified with maleic anhydride is selected from the group consisting of a maleic anhydride grafted high density polyethylene (MAN-g-HDPE), a maleic anhydride grafted very low density polyethylene (MAN-g-VLDPE), a maleic anhydride grafted ethylene propylene rubber (MAN-g-EPR), a maleic anhydride grafted ethylene propylene diene monomer rubber (MAN-g-EPDM), and mixtures thereof.

3. A maleic anhydride modified ethylene polymer/ionomer/high density polyethylene blend of claim 1 wherein said ethylene polymer modified with maleic anhydride is a maleic anhydride grafted high density polyethylene (MAN-g-HDPE).

4. A maleic anhydride modified ethylene polymer/ionomer/high density polyethylene blend of claim 1 wherein said ethylene polymer modified with maleic anhydride is a maleic anhydride grafted very low density polyethylene (MAN-g-VLDPE).

5. A maleic anhydride modified ethylene polymer/ionomer/high density polyethylene blend of claim 1 wherein said ethylene polymer modified with maleic anhydride is a maleic anhydride grafted ethylene propylene diene monomer rubber (MAN-g-EPDM).

6. A method of improving impact resistance of an ionomer/high density polyethylene blend to comprising the steps of:

(i) adding for every one hundred parts by weight cumulative of ionomer and high density polyethylene from one to twenty parts by weight maleic anhydride modified ethylene polymer; and (ii) mixing said maleic anhydride modified ethylene polymer, ionomer and high density polyethylene at elevated temperature and high shear rate.

7. A method of claim 6 wherein said ethylene polymer modified with maleic anhydride is selected from the group consisting of a maleic anhydride grafted high density polyethylene (MAN-g-HDPE), a maleic anhydride grafted very low density polyethylene (MAN-g-VLDPE), a maleic anhydride grafted ethylene propylene rubber (MAN-g-EPR), a maleic anhydride grafted ethylene propylene diene monomer rubber (MAN-g-EPDM), and mixtures thereof.

8. A method of claim 6 wherein said ethylene polymer modified with maleic anhydride is a maleic anhydride grafted high density polyethylene (MAN-g-HDPE).

9. A method of claim 6 wherein said ethylene polymer modified with maleic anhydride is a maleic anhydride grafted very low density polyethylene (MAN-g-VLDPE).

10. A method of claim 6 wherein said ethylene polymer modified with maleic anhydride is a maleic anhydride grafted ethylene propylene diene monomer rubber (MAN-g-EPDM).

* * * * *

UNITED STATES PATENT AND TRADEMARK OFFICE
CERTIFICATE OF CORRECTION

PATENT NO. : 6,569,947 B1
DATED : May 27, 2003
INVENTOR(S) : Feinberg Stewart Carl It is certified that error appears in the above-identified patent and that said Letters Patent is hereby corrected as shown below:

<u>Title page,</u>
Item [54], add -- RESISTANCE -- to end of title

Signed and Sealed this

Eighteenth Day of May, 2004

JON W. DUDAS
*Acting Director of the United States Patent and Trademark Office*